Sept. 23, 1941.                J. A. PARSONS                 2,257,068
                        MOLDING CASEIN PLASTIC ARTICLES
                           Filed Jan. 26, 1938
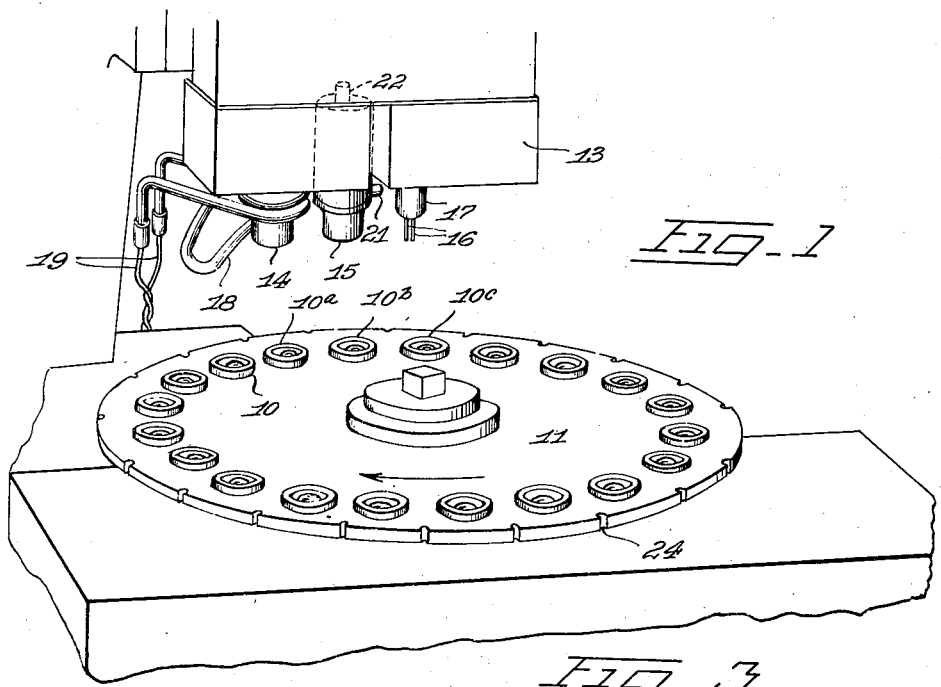
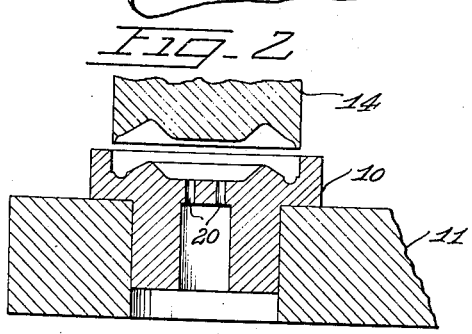
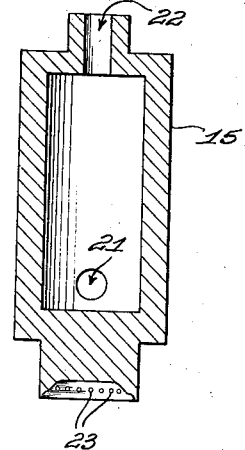
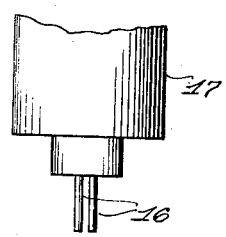
Inventor
John A. Parsons
By Foster & Codier
        Attorney Patented Sept. 23, 1941

2,257,068

UNITED STATES PATENT OFFICE 2,257,068

MOLDING CASEIN PLASTIC ARTICLES

John A. Parsons, Bainbridge, N. Y., assignor to American Plastics Corporation, New York, N. Y., a corporation of New York Application January 26, 1938, Serial No. 187,082

9 Claims. (Cl. 18—43)

The present invention relates to a method of making molded casein articles.

The invention deals particularly with the manufacture of such molded pieces as are in the form of buttons or beads or other articles containing suitably arranged perforations, for example thread holes in buttons, holes in beads for stringing the same, in one modification, although the invention also embraces the manufacture of molded disc-like objects such as poker chips, checkers, and various kinds of game pieces which are not provided with holes through the same. Another article of manufacture, important in the casein industry is fancy buckles such as belt buckles and the like, which also can be made according to the present invention.

In accordance with the present invention, the molding operation is carried out on an apparatus which is somewhat similar to an ordinary punch-press, but modified. The press carries a dial or rotary plate, having one or more rows of evenly spaced holes near its margin, into which are fitted die bottoms, which (for the making of buttons, beads and other articles which are to have small perforations) are provided with one or more small holes through which any excessive quantity of the casein plastic mass can be forced, and through which the hole punchings are forced.

Discs or slugs or other suitably sized pieces are fed into these mold bottoms, for example by hand, and the finished buttons are removed from these mold bottoms, for example by hand, for further treatment.

In accordance with the present invention, the "slide" of the punch press carries two or if desired three mold tops. The first mold top is heated, for example by an electric heater, and is maintained at a relatively high temperature, say from the boiling point of water up to about 300° F., or perhaps a little more in some cases. The function of this hot mold top is to partly shape the article, and to heat the article while in the mold bottom. This mold top is preferably of approximately the shape of the finished article, but does not have to carry all of the detail work of the top of the finished article (face of the button).

The pressing of the disk or slug of casein plastic material in this step should be continued for a sufficient time to heat the article to a predetermined temperature, and to at least partially mold the upper surface of the article.

The hot mold top is then raised, and the dial is moved forward one space, whereupon the cold mold top descends upon the heated partly molded casein plastic article, to give the finished top surface of the same. This cold mold top may also carry punch pins for punching out the thread holes of the buttons, or may carry a punch pin for punching out the holes in beads or similar articles.

If desired, the pins can be omitted from the cold mold top.

A third top can also be provided if desired, constituting merely punch pins for punching out the holes in the finished article.

An apparatus, suitable for carrying out the present invention is illustrated in the accompanying drawing, forming part of this specification.

In said drawing Figure 1 is a perspective view of an assembly of apparatus, Figure 2 is a showing, on a much larger scale (in section) of a hot mold top with one of a series of mold bottoms. Figure 3 illustrates in section, a cold mold top, which also cooperates with a mold bottom (not shown). Figure 4 shows, in elevation, the lower end of a punch for punching thread-holes, in buttons. This latter element may be used or not, as desired.

The annexed drawing illustrates the apparatus and certain details thereof.

Figure 1 is a perspective view showing the essential parts of the punch-press, carrying the mold bottoms 10, mounted on the dial 11. The slide of the punch-press is here shown in the elevated position at 13, and this is shown as carrying a hot mold top 14, a cold mold top 15 and a lug carrying punch pins 16, for punching holes in buttons, said pins being carried on a plunger 17.

The hot mold top 14, as illustrated in Figure 2, carries a bottom which preferably has approximately the same shape as the face of the button to be made, but need not carry all of the details of the face of the finished button.

The punch press is so arranged that the elements 14 and 15 stay in the downward position for a substantial period, for example three seconds. The hot mold top 14 is heated by means of an electric heater shown diagrammatically at 18. The current is supplied by the wires 19, so adjusted as to maintain the bottom of the hot top 14 at a predetermined temperature, say somewhat higher than the temperature to which it is desired to heat the casein plastic mass while on the mold bottom 10.

The mold bottom carrying a slug or disk to be molded into a button, is in the position 10a, directly below the hot mold top 14, and a partially molded button will at this time be in the mold bottom in a position 10b, and a finished button ready for having the holes punched therein will be in position 10c. Then the element 13 will be brought down under pressure, the pressure of 14 on the plastic mass in the mold bottom 10a may be around 1,000 to 2,000 pounds pressure, per square inch. At any event the pressure should be sufficient for effecting the desired molding of the particular article being manufactured. The hot top also heats the casein plastic mass in 10a, sufficiently to render the same moldable. This temperature will vary depending upon the properties desired in the final article, size, color and the like. Preferably the casein mass is heated to substantially above the boiling point of water, 212° F., in this operation, and preferably the said casein mass is heated to a temperature between 225° F. and 280° F. For this purpose the hot top 14 will be maintained at a temperature 20 to 50° F. above that to which the casein is to be heated.

The part 13 and associated parts 14, 15 and 17, may remain for several seconds, say 2 to 5 seconds, in the downward position. Then, the molding having been sufficiently accomplished and the casein mass being heated sufficiently, the part 13 is raised, and the dial 11 is rotated one space, bringing the piece which was under 14 into the position 10b, whereupon the part 13 is again brought down, and the cold mold top 15 impresses its pattern on the top of the button in the mold bottom in position 10b. The pressure exerted by the cold top 15 may be the same as that exerted by 14, or it may be somewhat higher.

The molding having been sufficiently accomplished, and the article cooled, the part 13 is again raised and the dial 11 is again rotated one space, so that the article which was in position 10b comes into position 10c, under the pins 16 which are to punch the thread holes in the button. The element 13 and associated parts is again lowered, the pin 16 punching the thread holes in the button.

As shown in Figure 2, the mold bottoms 10 are provided with holes 20, which serve two distinct purposes. During the molding operation, any excess amount of the casein plastic mass may be forced downwardly through the holes 20. Subsequently when the pins 16 descend, they punch out the thread holes, forcing the punchings down through the holes 20.

Figure 2 shows the operation of the hot top, approaching the mold bottom 10. During this operation, there is of course a disc of the casein plastic mass, which previously has been inserted into this mold bottom 10, or if desired a suitable slug of the material, of a size sufficient to form the desired button can be so used. It is not always convenient to employ exactly the quantity of the casein plastic mass, which is to go into the final button, and hence it is advisable to use slugs or discs which contain a little more of the casein mass than is to go into the final button so as to allow a small amount of this to extrude downwardly into or through the holes 20, in the mold bottom.

It will be observed that Figures 3 and 4 are shown on a much smaller scale than Figure 2, but on a much larger scale than Figure 1.

Figure 3 shows the cold top 15. A cold water inlet 21 and a water outlet 22 are provided, for keeping this mold top cold, for example 70° F. or below.

In Figure 3 on the molding surfaces, the markings 23 indicate patterns to be impressed on the top or front of the button.

It will be understood that suitable flexible tubing is connected to 21 and 22, for supplying and withdrawing the cooling fluid.

Figure 4 represents the lower part of the element 17 and the pins 16, which are of course optional, and would be omitted in making unperforated articles such as poker chips or the like. Also if desired, the element 17 can be dispensed with and the pins 16 can be mounted in the bottom of the cold top 15.

The elements 14, 15 and 16 are of course arranged on the arc of a circle directly above the circular row of mold bottoms 10 on the dial 11. The arrow on the dial shows the direction of rotation thereof.

In practice, for making 27 line buttons about 2 mm. thick, I have found that a convenient timing operation is as follows: The element 13 is in its downward position for 3 seconds, and one and a half seconds are occupied in raising the element 13, rotating the dial one space, and again lowering the element 13 and the parts carried thereby. I do not wish to limit myself to these time factors. In speaking of a 27 line button, this is a button the diameter of which is .675 inch. The time factor will necessarily be varied depending upon the size and shape of the buttons under treatment.

Heretofore in molding casein plastics, by the processes ordinarily used, temperatures much above 200° F. could not be used. I am referring here to the temperature to which the casein plastic is heated. In accordance with the present invention, I preferably heat the casein plastic to substantially higher temperatures, say above 212° F., and preferably between 225° F. and 280° F. For use in making buttons, even those containing delicate pastel shades of color, I have found that temperatures between 240° F. and 260° F. are perfectly safe. The reason why such high temperatures can be used, is because the temperature is maintained only for a very short time (i. e. in the example given, only a few seconds).

The dial 11 is provided on its periphery with a series of notches 24. By means of these notches and a suitable pawl arrangement (not shown) the dial 11 is intermittently rotated, and the distance between adjacent notches 24 constitutes one space, as referred to above.

Suitable heat insulation is preferably provided, around the hot mold top 14 and around the cold mold top 15, and particularly between these two elements, for preventing transfer of heat between these two elements.

The mold bottoms 10 are initially at or about normal room temperature. The said bottoms may become warmed up somewhat, while under the hot mold top 14, and may be cooled somewhat while under the cold mold top 15. Ordinarily by the time these mold bottoms have reached the position 10a they are at about normal room temperature.

A particular advantage of this invention is the fact that the equipment is relatively inexpensive. Providing a considerable number of the mold bottoms 10 is not expensive because these are quite simple in construction. There is usually no ornamentation desired on the backside of the button. The hot mold top 15 is of relatively simple construction and it is not necessary to provide ornamentation on this, similar to 23. The element 14 could be regarded as a forming element, while the ornamentation of the face of the button is largely accomplished by the cold mold top 15.

A particular advantage of the present invention is that it enables the production of an immense number of finished articles, say buttons per hour, with a relatively small outlay for molding equipment.

The casein plastic material to be treated by this process, is of course, in the uncured condition.

After the molding operation, the articles are finished in a novel manner.

For this purpose the molded articles are preferably placed into a cage which may be in the form of a rotary perforated drum. This perforated drum is then closed and put into a tank containing formaldehyde solution or other hardening agents for converting the plasticized casein, formed into buttons, into a wholly insoluble condition. Depending upon the thickness of the button, the length of time in the formaldehyde solution varies. Thus for buttons 3 millimeters thick, 5 days in the formaldehyde solution of 5 to 10% strength, is sufficient. During the whole of this time the drum carrying the buttons is slowly rotated in order to agitate the buttons and to agitate the formaldehyde solution in contact with the buttons, in order to allow a very uniform formalizing of the casein mass. This constitutes the curing.

When the formalizing treatment has been sufficiently accomplished, the rotary cage is lifted out of the formaldehyde solution and it may be if desired, be given a water wash, although this is not necessary.

The cage is then run into a drier, through which a current of air is forced, preferably at an elevated temperature, such as 130 to 160° F. The time in the drying operation may be about one day for each millimeter of thickness of the plastic articles being dried. The cage is rotated continuously during drying.

After the drying has been completed, the articles while still in the rotary drum, are immersed for a short time in a chemical polish solution, such as sodium hypochlorite solution. The drum is rotated in order to agitate the articles while in this solution, but the time of treatment in this solution does not have to be very long, 2 to 10 minutes usually being sufficient, depending upon the temperature of the solution, which may be from about 100 to 160° F.

When the chemical polishing has been sufficiently effected, the rotary drum carrying the buttons or other articles is then lifted out of the chemical polish solution. The buttons can be given a short washing in water at this stage if desired, but this is not wholly essential. For this purpose the rotary cage carrying the articles may simply be dipped into a tank of water or may be rotated in a tank of water for a short time.

Drums carrying the articles are then immersed for a short time in an acid-treating liquor, for example sulphuric acid of about 1 or 2% strength. This treatment can be continued for say two or three minutes, while rotating the drum, (the chemical polishing and acid treatment are described in a recent patent of Vawter, 2,103,993). The cage carrying the articles are then immersed in water and washed for a few minutes, preferably while rotating the cage in order to agitate the articles and the water.

The cage carrying the articles is then put back into the drier (or put into another drier) for drying the same, which operation may be continued for half an hour or so, during which time the cage is rotated to agitate the articles and to allow free contact of the surfaces with the air for drying purposes.

The finishing is then completed, and the cage is opened and the articles removed therefrom, for inspection, sorting, packaging and they are then ready for sale.

The buttons can of course be dyed after the chemical polishing and acid treatment if desired, but for most purposes it is advisable to mix the dye or pigment with the original casein mass, to give buttons having dye throughout the body of the same.

Buttons which are off-color can of course be subsequently dyed to any particular dark color, by use of wool dyes.

I claim:

1. A process of molding casein plastic articles which comprises placing a piece of casein plastic mass in a cool mold bottom, moving said piece and mold bottom to a position under a hot mold top, applying molding pressure on said piece by said hot mold top while said piece is carried in said mold bottom, continuing said hot pressure for a sufficient time to heat said piece and to at least partly mold said piece into shape, then moving said mold top away from said molded piece, then moving said piece, while in said mold bottom to a position under a cold mold top, applying said cold mold top under pressure upon said at least partly molded piece to complete the molding of the article and to chill the molded article, and repeating said cycle of steps on successive additional pieces of casein plastic mass.

2. A process of molding casein plastic articles which comprises placing a piece of casein mass in a cool mold bottom, moving said piece and mold bottom to a position under a hot mold top, applying molding pressure on said piece by said hot mold top while said piece is carried in said mold bottom, continuing said hot pressure for a sufficient time to heat said piece and to at least partly mold said piece into shape, then moving said mold top away from said molded piece, then moving said piece, while in said mold bottom to a position under a cold mold top, applying said cold mold top under pressure, upon said at least partly molded piece to complete the molding of the article and to chill the molded article, punching out holes through said mold bottom, and repeating said cycle of steps on successive additional pieces of casein plastic mass.

3. In molding articles which are to have a hole therein, the steps of molding casein plastic mass in a mold bottom provided with a hole extending through its wall and allowing excess of casein plastic mass to be extruded through said hole during said molding step, and thereafter punching a hole in said molded article, while forcing the punchings through said hole in said mold wall.

4. In making a molded casein plastic article, the steps of supplying a blank of a casein plastic material, while in an unheated state, to a mold bottom at approximately room temperature, applying a hot mold top already heated to a temperature considerably above 212° F., under molding pressure to said blank, while the latter is on said mold bottom, said mold top being heated prior to its application to said blank, sufficiently to heat the casein plastic material to a temperature above 212° F. and thereby molding said casein plastic material.

5. In molding, the step of molding casein plastic mass as covered in claim 4, while heating said casein plastic mass to a temperature between 240 to 260° F.

6. In making molded casein plastic article, the steps of supplying a casein plastic mass while in an unheated state, to a mold part and heating said mass to a temperature substantially above 212° F. by molding the same with a hot mold part applied to said casein plastic mass, and thereafter removing said hot mold part from said hot-molded casein article, and applying a cold mold part thereto sufficiently to effect further molding and to promptly cool said hot-molded article.

7. Process of molding casein articles which comprises first partly molding an article by pressure upon a blank of casein plastic, such pressure being applied thereupon by a mold part which is already at a temperature considerably above 212° F., which operation also heats said casein plastic to a molding temperature somewhat above 212° F., then moving the partly molded casein article away from the place of such hot molding step, to a place where it can be acted upon under pressure by a cold mold part which is separate from the above mentioned hot mold part, applying molding pressure upon the partly molded article by pressure of said cold mold part upon said hot molded article, to complete the molding operation and to cool said article, and removing said fully molded article from the place of said last mentioned molding treatment.

8. Process of making molded articles which comprises first partly molding an article by pressure upon a blank of plastic material, such pressure being applied thereupon by an already hot mold part which also heats said plastic material under treatment to a hot molding temperature, then moving the partly molded article away from the place of such hot molding step, to a place where it can be acted upon under pressure with a cold mold part which is separate from the above mentioned hot mold part, applying molding pressure upon the partly molded hot article by pressure of said cold mold part thereupon, to complete the molding operation and to cool said article, punching the required number of holes in said article, and removing said article.

9. In the art of making molded articles from casein plastic mass, the steps of first partially molding a casein plastic article in a mold of which a part is maintained hot, and thereafter completing the molding of the article in a cold mold, while said article still carries heat from said first mentioned step.

JOHN A. PARSONS.